(12) United States Patent
Lee (10) Patent No.: US 11,333,300 B2
(45) Date of Patent: May 17, 2022

(54) HIGH PRESSURE TANK

(71) Applicants: Hyundai Motor Company, Seoul (KR); Kia Motors Corporation, Seoul (KR)

(72) Inventor: Dong Sun Lee, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 206 days.

(21) Appl. No.: 15/375,305

(22) Filed: Dec. 12, 2016

(65) Prior Publication Data

US 2018/0045371 A1    Feb. 15, 2018

(30) Foreign Application Priority Data

Aug. 9, 2016    (KR) .......................... 10-2016-0101107

(51) Int. Cl.
*F17C 1/06*  (2006.01)
*F17C 1/00*  (2006.01)
(Continued)

(52) U.S. Cl.
CPC ........ *F17C 1/06* (2013.01); *F17C 2201/0109* (2013.01); *F17C 2203/066* (2013.01);
(Continued)

(58) Field of Classification Search
CPC ............. F17C 1/06; F17C 2201/0109; F17C 2203/0619; F17C 2203/066;
(Continued)

(56) References Cited

U.S. PATENT DOCUMENTS 2,744,043 A * 5/1956 Ramberg .............. B29C 53/602
156/155
3,293,860 A * 12/1966 Stedfeld ................ B29C 53/602
156/155
(Continued)

FOREIGN PATENT DOCUMENTS

CN        102939496 A      2/2013
JP         S413012 B        1/1966
(Continued)

OTHER PUBLICATIONS

"Elastic Modulus and its Influencing Factors", Common Knowledge in the Art, 2014, 4 pages.
(Continued)

*Primary Examiner* — Gideon R Weinerth
(74) *Attorney, Agent, or Firm* — Mintz Levin Cohen Ferris Glovsky and Popeo, P.C.; Peter F. Corless (57) ABSTRACT

A high pressure tank is provided. The high pressure tank provides improved strength and stiffness by optimizing a laminating pattern and a structure of a fiber reinforced plastic that forms a dome portion of the high pressure tank used in a fuel tank of a fuel cell vehicle. The fiber reinforced plastic having relatively high strength is mixed and used for a weak portion of a dome portion of a support layer of a high pressure tank where stress caused by internal pressure of the high pressure tank is concentrated. In particular, bursting strength and stiffness is increased. The usage amount of the fiber reinforced plastic, the number of windings and a thickness by directly reinforcing a weak point of the dome portion are reduced. Accordingly, manufacturing costs of the high pressure tank are reduced.

12 Claims, 10 Drawing Sheets

(51) Int. Cl.
  *F17C 1/02* (2006.01)
  *F17C 1/04* (2006.01)
  *B29C 70/86* (2006.01)

(52) U.S. Cl.
  CPC .............. *F17C 2203/067* (2013.01); *F17C 2203/0619* (2013.01); *F17C 2205/0305* (2013.01); *F17C 2209/2154* (2013.01); *F17C 2221/012* (2013.01); *F17C 2223/0123* (2013.01); *F17C 2223/036* (2013.01); *F17C 2260/011* (2013.01); *F17C 2270/0168* (2013.01); *F17C 2270/0184* (2013.01); *Y02E 60/32* (2013.01)

(58) Field of Classification Search
  CPC ........ F17C 2203/067; F17C 2205/0305; F17C 2270/0184; F17C 2203/0665; F17C 2203/0123; F17C 2209/2154; F17C 2221/012; F17C 2223/0123; F17C 2223/036; F17C 2260/011; F17C 2270/0168; B65D 90/029; Y02E 60/32
  USPC ............... 220/588, 586, 589; 156/169, 172; 206/0.6
  See application file for complete search history.

(56) References Cited

U.S. PATENT DOCUMENTS

| | | | | |
|---|---|---|---|---|
| 3,372,075 | A * | 3/1968 | Holt | F17C 3/02 156/172 |
| 3,969,812 | A * | 7/1976 | Beck | B21D 51/24 29/421.1 |
| 4,053,081 | A * | 10/1977 | Minke | B01J 3/048 156/175 |
| 4,398,646 | A * | 8/1983 | Pechacek | F17C 1/04 220/586 |
| 4,438,858 | A * | 3/1984 | Grover | B29C 53/602 220/590 |
| 4,699,288 | A * | 10/1987 | Mohan | B29C 53/602 220/560.01 |
| 5,018,638 | A * | 5/1991 | Auberon | F17C 1/06 220/590 |
| 5,025,943 | A * | 6/1991 | Forsman | B29C 53/602 220/589 |
| 5,385,263 | A * | 1/1995 | Kirk | F17C 1/16 206/443 |
| 5,499,739 | A * | 3/1996 | Greist, III | B29C 53/602 138/30 |
| 5,547,533 | A * | 8/1996 | Berglund | B29C 65/5042 156/175 |
| 6,190,481 | B1 * | 2/2001 | Iida | B29C 53/8016 156/153 |
| 6,361,635 | B1 * | 3/2002 | Ayorinde | B29C 53/602 156/169 |
| 6,547,092 | B1 * | 4/2003 | Chervatsky | F17C 1/00 220/581 |
| 8,016,322 | B2 * | 9/2011 | Keehan | B61D 5/00 264/516 |
| 8,297,126 | B2 | 10/2012 | Kuebel | |
| 8,308,017 | B2 * | 11/2012 | Schlag | F16J 12/00 220/586 |
| 8,671,768 | B2 | 3/2014 | Kanezaki et al. | |
| 8,727,174 | B2 * | 5/2014 | Otsubo | F17C 13/06 156/188 |
| 8,740,009 | B2 * | 6/2014 | Otsuka | F17C 13/06 220/588 |
| 9,316,359 | B2 * | 4/2016 | Otsuka | B29C 53/602 |
| 9,879,825 | B2 * | 1/2018 | Kaneko | F17C 1/06 |
| 10,436,388 | B2 * | 10/2019 | Lee | F17C 13/002 |
| 10,456,994 | B2 * | 10/2019 | Nishiwaki | B29C 53/605 |
| 11,060,663 | B2 * | 7/2021 | Maekawa | F17C 1/02 |
| 2003/0037860 | A1 * | 2/2003 | Hauber | B29C 63/10 156/172 |
| 2004/0040969 | A1 * | 3/2004 | DeLay | F17C 1/06 220/586 |
| 2004/0045970 | A1 * | 3/2004 | Debecker | F16J 12/00 220/586 |
| 2005/0260373 | A1 * | 11/2005 | DeLay | B29C 53/602 428/36.4 |
| 2006/0096993 | A1 * | 5/2006 | Takashima | F17C 1/06 220/588 |
| 2007/0205201 | A1 * | 9/2007 | Cundiff | F17C 1/04 220/591 |
| 2008/0201932 | A1 | 8/2008 | Schlag | |
| 2009/0236349 | A1 * | 9/2009 | Mueller | F17C 1/06 220/590 |
| 2009/0263315 | A1 | 10/2009 | Mehta et al. | |
| 2010/0276434 | A1 * | 11/2010 | Berger | F17C 1/06 220/586 |
| 2010/0294776 | A1 * | 11/2010 | Liu | B60K 15/03006 220/562 |
| 2012/0024746 | A1 * | 2/2012 | Otsubo | F17C 13/06 206/524.3 |
| 2012/0048862 | A1 * | 3/2012 | Otsuka | F17C 13/06 220/495.01 |
| 2013/0087567 | A1 * | 4/2013 | Kaneko | F17C 1/06 220/590 |
| 2013/0153583 | A1 * | 6/2013 | Kleschinski | F17C 1/16 220/590 |
| 2013/0299505 | A1 * | 11/2013 | Otsubo | B29C 53/602 220/590 |
| 2014/0008373 | A1 * | 1/2014 | Sharp | F17C 1/06 220/586 |
| 2014/0166670 | A1 * | 6/2014 | Sirosh | F17C 1/02 220/581 |
| 2015/0192251 | A1 * | 7/2015 | Tupper | B65D 25/14 220/589 |
| 2017/0167661 | A1 * | 6/2017 | Yang | F17C 1/06 |
| 2017/0219165 | A1 * | 8/2017 | Takemoto | B29C 63/0073 |
| 2018/0045371 | A1 * | 2/2018 | Lee | F17C 1/06 |
| 2018/0066797 | A1 * | 3/2018 | Nakamura | F17C 1/06 |
| 2018/0104916 | A1 * | 4/2018 | Nishiwaki | B29C 53/605 |
| 2018/0180222 | A1 * | 6/2018 | Ueda | F17C 1/16 |
| 2018/0283609 | A1 * | 10/2018 | Teruhira | B29C 53/602 |
| 2018/0340655 | A1 * | 11/2018 | Lee | F17C 13/002 |
| 2019/0170297 | A1 * | 6/2019 | Criel | F17C 1/06 |
| 2019/0203883 | A1 * | 7/2019 | Kojima | F17C 1/16 |
| 2019/0249827 | A1 * | 8/2019 | Terada | F17C 1/005 |
| 2020/0049312 | A1 * | 2/2020 | Sawai | F17C 1/06 |
| 2020/0116304 | A1 * | 4/2020 | Lee | F17C 1/00 |
| 2020/0141538 | A1 * | 5/2020 | Umetsu | F17C 1/00 |
| 2020/0347992 | A1 * | 11/2020 | Volkmer | F17C 13/002 |
| 2021/0239269 | A1 * | 8/2021 | Baumer | B29C 53/80 |
| 2021/0270419 | A1 * | 9/2021 | Takami | F17C 1/00 |

FOREIGN PATENT DOCUMENTS

| | | |
|---|---|---|
| JP | H08216277 A | 8/1996 |
| JP | 2004197812 A | 7/2004 |
| JP | 2010270878 A | 12/2010 |
| JP | 2011-163354 A | 8/2011 |
| JP | 2012246962 A | 12/2012 |
| JP | 5408351 B2 | 2/2014 |
| JP | 2015-020280 A | 2/2015 |
| KR | 10-0469636 B1 | 1/2005 |
| KR | 10-1487757 B1 | 1/2015 |
| WO | 2009/129530 A1 | 10/2009 |
| WO | 2011154994 A1 | 12/2011 |

OTHER PUBLICATIONS

Office Action dated Sep. 1, 2020 in corresponding Chinese Patent Application No. 201611160847.1.

* cited by examiner

HIGH-ANGLE HELICAL PATTERN(45~88°)

FIG. 6B

LOW-ANGLE HELICAL PATTERN(10~44°)

HIGH PRESSURE TANK

CROSS-REFERENCE TO RELATED APPLICATION

This application claims under 35 U.S.C. § 119(a) the benefit of Korean Patent Application No. 10-2016-0101107 filed on Aug. 9, 2016, the entire contents of which are incorporated herein by reference.

BACKGROUND

(a) Technical Field

The present disclosure relates to a high pressure tank, and more particularly to a high pressure tank which provides improved strength and stiffness reinforcement by optimizing a laminating pattern and a structure of a fiber reinforced plastic that form the tank.

(b) Description of the Related Art

Generally, a fuel cell vehicle, which uses hydrogen as fuel, includes a high pressure fuel tank for storing hydrogen in the form of high pressure gas. The high pressure fuel tank includes an interior liner layer which obstructs penetration of gas and an outer support layer which supports internal tank pressure. The liner layer is formed from a plastic material and the support layer is formed from a high-priced fiber reinforced plastic.

For example, the carbon fiber reinforced plastic used for the support layer of the high pressure fuel tank is a composite material formed using carbon fiber as reinforcing fiber. The carbon fiber reinforced plastic may be used to manufacture a composite body which is light in weight and has improved strength and elasticity. However, the carbon fiber reinforced plastic is a high-priced material with an increased cost when compared with carbon steel. The fiber reinforced plastic is an anisotropic material that has varying strength based on a laminating pattern of fiber. When the laminating pattern is compromised, the high strength cannot be obtained even though a substantial amount of material is used.

The above information disclosed in this section is merely for enhancement of understanding of the background of the disclosure and therefore it may contain information that does not form the prior art that is already known in this country to a person of ordinary skill in the art.

SUMMARY

The present disclosure provides a high pressure tank with improved strength and stiffness reinforcement by optimizing a laminating pattern and a structure of a fiber reinforced plastic for forming a dome portion of the high pressure tank for use in a fuel tank of a fuel cell vehicle or the like.

In an exemplary embodiment, a high pressure tank may include a support layer having an outer layer of the high pressure tank that includes a cylinder portion at a center thereof. A dome portions may be formed at both sides of the cylinder portion. The dome portion may include a low-angle interior helical layer portion that forms an interior layer, and a low-angle outer helical layer portion may form an outer layer. The low-angle interior helical layer portion that include a plurality of low-angle interior helical layers. At least one low-angle interior helical layer of the plurality of low-angle interior helical layers may be a high-strength low-angle interior helical layer having a greater stiffness than the low-angle interior helical layers.

In an exemplary embodiment, the low-angle interior helical layer portion may be formed in a thickness region that corresponds to about 5% to 30% of an overall thickness of the dome portion. The low-angle outer helical layer portion may be formed in a thickness region that corresponds to about 70% to 95% of an overall thickness of the dome portion. In an exemplary embodiment, a portion of the plurality of low-angle inner helical layers of the low-angle inner helical layer portion may be high-strength low-angle inner helical layers having a greater stiffness than the remaining low-angle inner helical layers that may be low-strength low-angle inner helical layers.

For example, the high-strength low-angle inner helical layers may be disposed as inner layers of the low-angle inner helical layer portion. The low-strength low-angle inner helical layers may be disposed as outer layers of the low-angle inner helical layer portion. In another exemplary embodiment, the high-strength low-angle inner helical layers may be disposed as outer layers of the low-angle inner helical layer portion. The low-strength low-angle inner helical layers may be disposed as inner layers of the low-angle inner helical layer portion.

In some exemplary embodiments, the high-strength low-angle inner helical layer and the low-strength low-angle inner helical layer may be disposed in a mixed manner without limiting the order of laminating the layers, or may be disposed in a mixed manner in which the layers are alternately laminated on one another. According an exemplary embodiment, fiber reinforced plastics having that have an improved when compared to traditional plastics may be mixed and used for a weak portion of a dome portion of a support layer of a high pressure tank where stress caused by internal pressure of the tank is concentrated. Accordingly, bursting strength and stiffness may be increased and the usage amount of the fiber reinforced plastic may be reduced. The number of windings may be reduced by directly reinforcing a weak point of the dome portion and the manufacturing costs of the high pressure tank may be reduced.

BRIEF DESCRIPTION OF THE DRAWINGS

The above and other features of the present disclosure will now be described in detail with reference to exemplary embodiments thereof illustrated in the accompanying drawings which are given hereinbelow by way of illustration, and thus are not limitative of the present disclosure, and wherein.

Reference numerals set forth in the Drawings include reference to the following elements as further discussed below:

100: high pressure tank
110: liner layer
112: metal boss
120: support layer
122: cylinder portion
122a: hoop layer
122b: helical layer
124: dome portion
126a: low-angle inner helical layer portion
126aa: high-strength low-angle inner helical layer
126ab: low-strength low-angle inner helical layer
126b: low-angle outer helical layer portion
128: transition portion It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in part by the particular intended application and use environment. In the figures, reference numbers refer to the same or equivalent parts of the present disclosure throughout the several figures of the drawing.

DETAILED DESCRIPTION

Hereinafter reference will now be made in detail to various exemplary embodiments of the present disclosure, examples of which are illustrated in the accompanying drawings and described below. While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents and other exemplary embodiments, which may be included within the spirit and scope of the disclosure as defined by the appended claims.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present invention clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Figure 1:
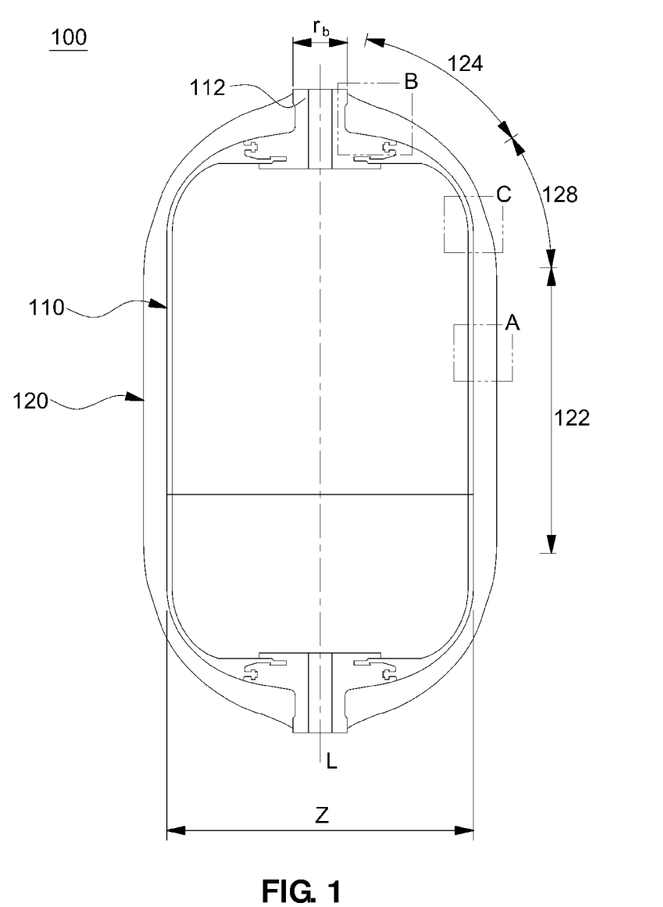
FIG. 1 is an exemplary cross-sectional view illustrating a high pressure tank according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles Hereinafter, an exemplary embodiment of the present disclosure will be described in detail with reference to the accompanying drawings. As illustrated in FIG. 1, a high pressure tank 100 according to the present disclosure may include a liner layer 110 which is an inner layer and may obstruct or block penetration of fuel in the form of high pressure gas and a support layer 120 which is an outer layer and supports tank internal pressure and a metal boss 112 integrally disposed at an inlet side of the liner layer 110 coupled to an opening and closing valve (not illustrated).

Figure 2:
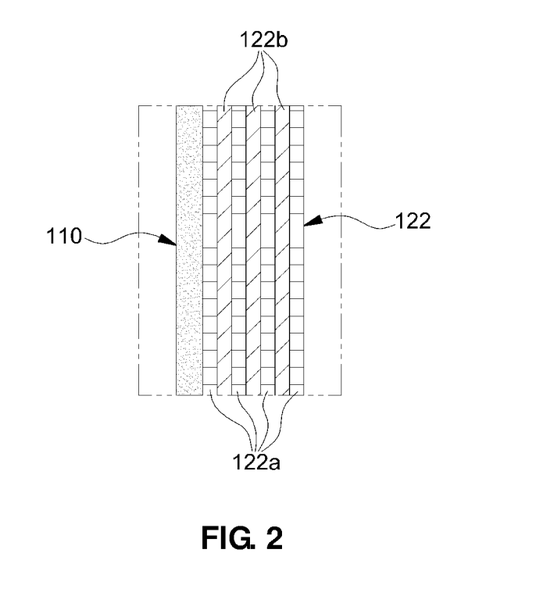
FIG. 2 is an exemplary enlarged view illustrating part A in FIG. 1 according to an exemplary embodiment of the present disclosure.

The liner layer 110 may be formed by injection molding a plastic material. The metal boss 112 may be integrally formed at the inlet side of the liner layer 110 by inserting the metal boss 112 into an injection mold and performing the injection molding. The support layer 120 may be formed by a winding laminating method of winding and laminating a fiber reinforced plastic around an outer surface of the liner layer 110 and may include a cylinder portion 122 at a center thereof. Dome portions 124 may be integrally formed at both sides of the cylinder portion 122. The cylinder portion 122 may be a substantially straight section of the high pressure tank 100 and may be formed in a cylindrical shape along an external shape of a central portion of the liner layer 110. As illustrated in FIG. 2, the cylinder portion 122 may have a cross-sectional structure in which hoop layers 122a and helical layers 122b, which are laminated by winding the fiber reinforced plastic around the outer surface of the central portion of the liner layer 110, are alternately laminated.

In particular, each of the hoop layers 122a and the helical layers 122b may be formed by winding once the fiber reinforced plastic around the outer surface of the liner layer 110, or may be formed by winding several times the fiber reinforced plastic around the outer surface of the liner layer 110. In other words, each of the hoop layers 122a and the helical layers 122b illustrated in FIG. 2 may be formed by winding at least one time the fiber reinforced plastic around the outer surface of the liner layer 110. The configuration in which the hoop layer 122a is disposed in an inner layer region of a thickness region of the support layer 120 and laminated more adjacent to the liner layer 110 may be advantageous for increasing bursting strength of the high pressure tank 100. Accordingly, the hoop layer 122a and the helical layers 122b of the cylinder portion 122 may be initially laminated on the outer surface of the central portion of the liner layer 110 to be in (e.g., direct) contact with the outer surface of the central portion of the liner layer 110.

Figure 6A:
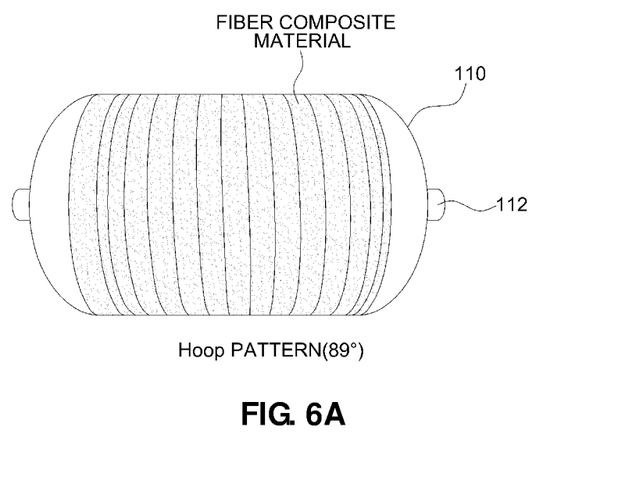
FIGS. 6A-6C are exemplary conceptual views illustrating types of winding patterns for the high pressure tank according to the exemplary embodiment of the present disclosure.
Figure 6B:
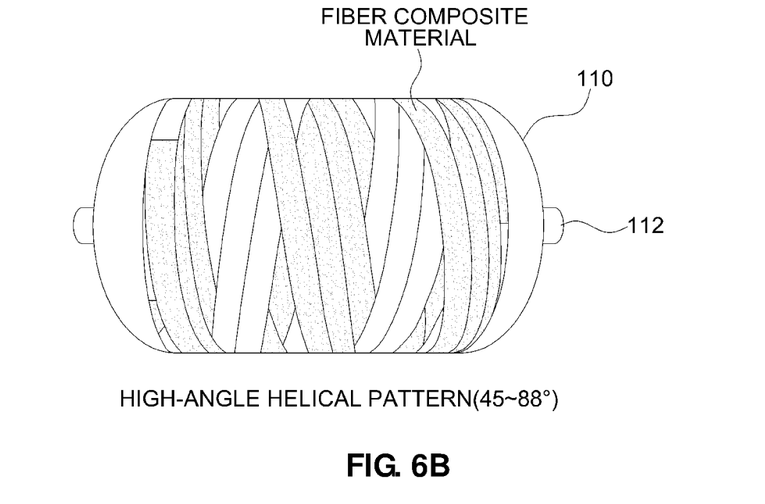
Figure 6C:
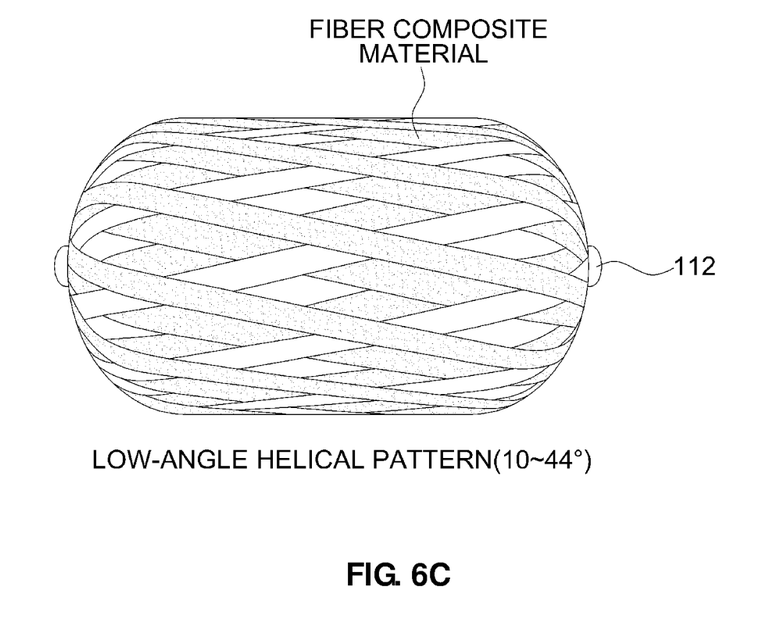

Referring to FIGS. 6A-6C, the hoop layers 122a may be formed by being laminated in a winding pattern in which the fiber reinforced plastic may be wound around the outer surface of the liner layer 110. In other words the fiber reinforced plastic may be wound at an approximately right angle with respect to a direction L of a central axis of the high pressure tank 100 (e.g., an axial direction of the liner layer 110). The helical layers 122b may be formed by being laminated in a winding pattern in which the fiber reinforced plastic, which is wound around the outer surface of the liner layer 110, is wound at an acute angle within a predetermined range with respect to the direction L of the central axis of the high pressure tank 100.

In particular, the hoop layers 122a may be formed by being laminated in a hoop pattern in which the fiber reinforced plastic is wound at an angle of about 89° with respect to the direction L of the central axis of the high pressure tank 100. The helical layers 122b may be formed by being laminated in a high-angle helical pattern in which the fiber reinforced plastic is wound at an acute angle of about 45° to 88° with respect to the direction L of the central axis of the high pressure tank 100 or in a low-angle helical pattern in which the fiber reinforced plastic is wound at an acute angle of about $\alpha$ to 44° with respect to the direction L of the central axis of the high pressure tank 100. For example, $\alpha$ may be a minimum winding angle of the fiber reinforced plastic, and $\alpha$ may be determined based on values of an outer diameter z of the liner layer 110 and an outer diameter $r_b$ of the metal boss 112. In other words, the minimum winding angle of the fiber reinforced plastic, which forms the low-angle helical pattern, may be determined based on $\alpha = \sin^{-1}(r_b/z)$.

Figure 3:
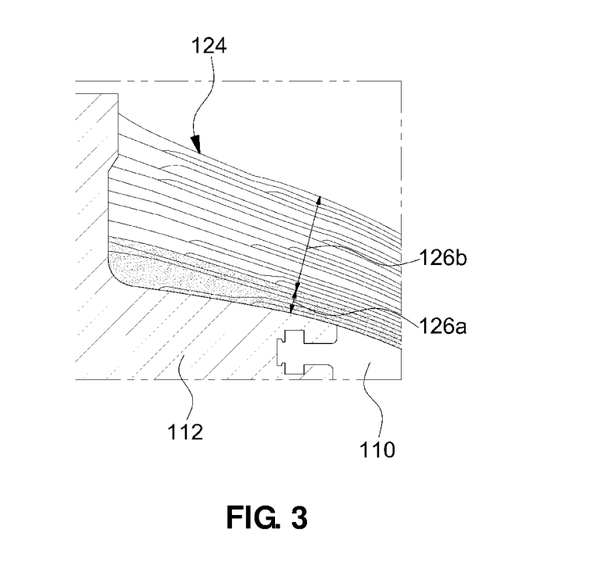
FIG. 3 is an exemplary enlarged view illustrating part B in FIG. 1 according to an exemplary embodiment of the present disclosure.

The dome portions 124 may be curved sections of the high pressure tank 100 and may be formed in an approximately hemispheric shape along external shapes of both end portions of the liner layer 110. As illustrated in FIG. 3, the dome portions 124 may be formed by winding several times the fiber reinforced plastic around outer surfaces of the both end portions of the liner layer 110 (e.g., the outer surfaces of both end portions of the liner layer 110 and an outer surface of the metal boss 112). In particular, for the dome portion 124, to directly reinforce stiffness and strength, to reinforce bursting stiffness and strength without increasing a thickness of the dome portion or using a separate reinforcing member, the fiber reinforced plastic having relatively high strength may be used for a partial region selected when the dome portion 124 is formed by winding the fiber reinforced plastic.

Additionally, based on a thickness direction of the dome portion 124, the dome portion 124 may include a low-angle inner helical layer portion 126a which is the inner layer and a low-angle outer helical layer portion 126b which is the outer layer. The fiber reinforced plastic may have a relatively high stiffness and strength that may be used for the low-angle inner helical layer portion 126a adjacent to the outer surfaces of both end portions of the liner layer 110 and the outer surface of the metal boss 112. The low-angle inner helical layer portion 126a may include a plurality of low-angle inner helical layers. At least one low-angle inner helical layer of the low-angle inner helical layers may be formed using the fiber reinforced plastic having a greater stiffness and strength than the fiber reinforced plastic of the other low-angle inner helical layers.

In other words, the low-angle inner helical layer portion 126a may include at least one high-strength low-angle inner helical layer 126aa which is formed by winding the fiber reinforced plastic, which may have a greater stiffness and strength than a fiber reinforced plastic of the low-angle outer helical layer portion 126b and may have a greater stiffness and strength than a fiber reinforced plastic of the other low-angle inner helical layers (e.g., a low-strength low-angle inner helical layer), around the outer surfaces of the liner layer 110 and the metal boss 112. For example, a low-strength low-angle inner helical layer 126ab and the high-strength low-angle inner helical layer 126aa may be formed by winding the fiber reinforced plastic around the outer surfaces of the liner layer 110 and the metal boss 112.

Since the fiber reinforced plastic having high strength and high stiffness may be used for at least a portion of the low-angle inner helical layer portion 126a of the dome portion 124 which is an inner layer, the usage amount of the high-priced high-strength fiber reinforced plastic may be reduced and the reinforce strength and stiffness of the dome portion 124 may be improved. When the dome portions 124 are formed in a multilayered shape by winding the fiber reinforced plastic around the outer surfaces of both end portions of the liner layer 110 and the outer surface of the metal boss 112, the low-angle inner helical layer portion 126a may be formed by winding the fiber reinforced plastic.

The the low-angle outer helical layer portion 126b may be formed by winding the fiber reinforced plastic. In particular, the dome portion 124 has the low-angle inner helical layer portion 126a that may be formed in an inner layer region adjacent to the outer surface of the liner layer 110 in the thickness direction of the dome portion 124. The low-angle outer helical layer portion 126b may be formed in an outer layer region in the thickness direction of the dome portion 124 by being laminated outside the low-angle inner helical layer portion 126a.

Typically, the inner layer region of the dome portion 124 in which the fiber reinforced plastic is wound first around the outer surface of the liner layer 110 is structurally affected by internal pressure of the high pressure tank 100 in comparison with the outer layer region. Accordingly, the inner layer region is weakened due to stress concentrated on the inner layer region. However, since the low-angle inner helical layer portion 126a that includes at least one high-strength low-angle inner helical layer 126aa may be formed in the inner layer region of the dome portion 124 as described above, the strength of the weak portion of the dome portion 124 may be improved.

In other words, overall strength of the dome portion 124 may be reinforced by using the fiber reinforced plastic having relatively high strength and stiffness in at least a portion region of the dome portion 124. In particular, since the fiber reinforced plastic having an increased strength and increased stiffness may be used for the low-angle inner helical layer portion 126a that constitutes the inner layer region of the dome portion 124, it is possible to more effectively reinforce strength of the dome portion 124 in comparison with the fiber reinforced plastic having high strength and high stiffness used for the low-angle outer helical layer portion 126b.

Generally, the number of laminated layers of the fiber reinforced plastic e.g., the number of windings) may be increased to improve weakness of the dome portion 124 and thus the thickness of the dome portion may be increased. When the number of laminated layers of the fiber reinforced plastic is merely increased, the reinforcement effect may not be sufficient in comparison with the usage amount of the fiber reinforced plastic. Accordingly, the substantial amount of fiber reinforced plastics may be required to be used, which causes a significant increase in manufacturing costs.

Therefore, as described above, since the low-angle inner helical layer portion 126a in the inner layer region which is a structurally weak portion of the dome portion 124 is formed using the fiber reinforced plastic having higher stiffness and strength than a fiber reinforced plastic of the low-angle outer helical layer portion 126b, stress may be prevented from being concentrated on the dome portion 124. Additionally, the usage amount of the fiber reinforced plastic may be reduced compared to the related art, to reduce the thickness of the dome portion 124 and may ensure the reinforcement effect at the same level as that of a typical dome portion (e.g., a dome portion made of a single fiber reinforced plastic).

Figure 4A:
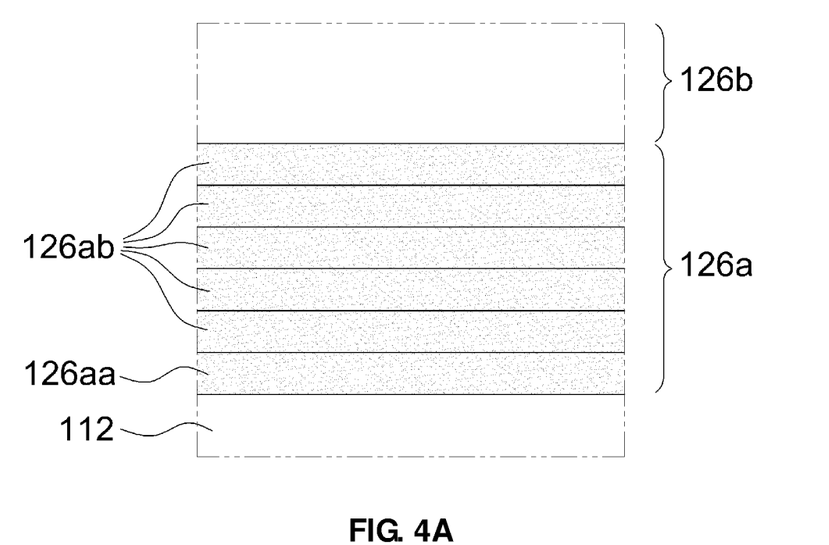
FIGS. 4A to 4H are exemplary views illustrating a low-angle inner helical layer portion according to the exemplary embodiment of the present disclosure.
Figure 4B:
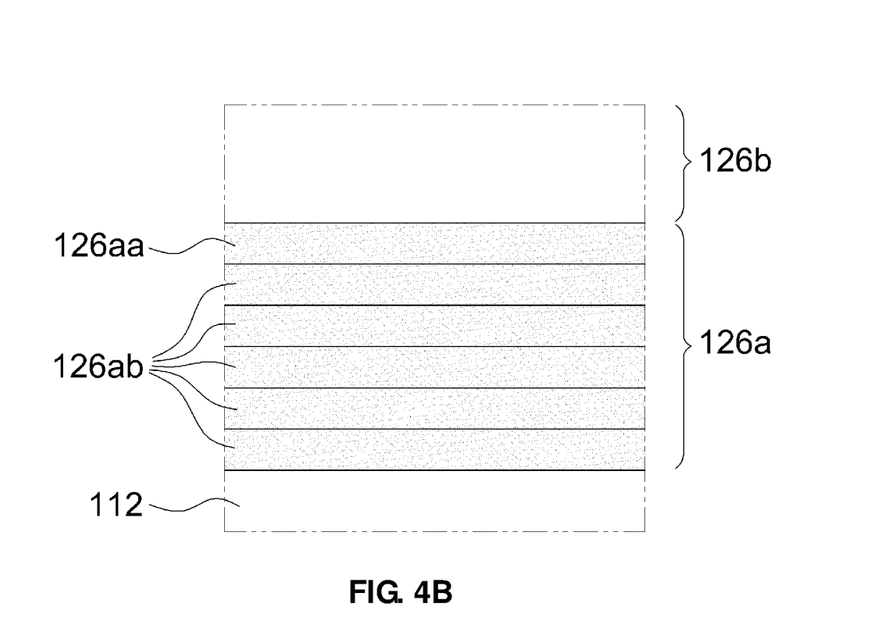
Figure 4C:
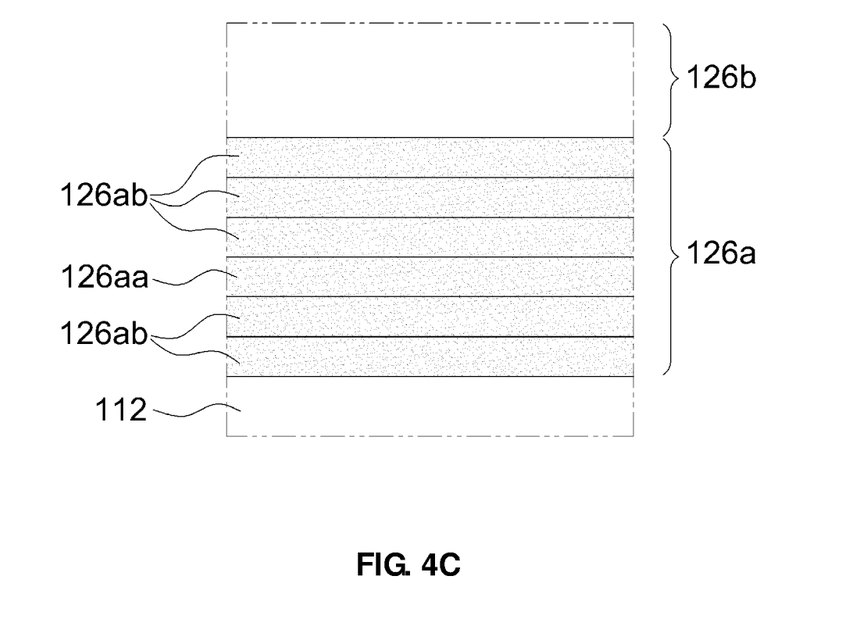

Further, a detailed structure of the low-angle inner helical layer portion 126a will be described with reference to FIGS. 4A to 4H. The attached FIGS. 4A to 4D are views illustrating the low-angle inner helical layer portion 126a according to the exemplary embodiment of the present disclosure. As illustrated in FIGS. 4A-4C, the low-angle inner helical layer portion 126a may include the plurality of low-angle inner helical layers. One low-angle inner helical layer of the plurality of low-angle inner helical layers may be configured as the high-strength low-angle inner helical layer 126aa having relatively greater stiffness and strength than the other low-angle inner helical layers. In other words, the high-strength low-angle inner helical layer 126aa may be disposed as a lowest layer of the low-angle inner helical layer portion 126a and may be in (e.g., direct) contact with the outer surface of the liner layer 110 and the outer surface of the metal boss 112 FIG. 4A. The high-strength low-angle inner helical layer 126aa may be disposed as a highest layer of the low-angle inner helical layer portion 126a FIG. 4B or may be disposed as any one layer between the lowest layer and the highest layer FIG. 4C.

Figure 4D:
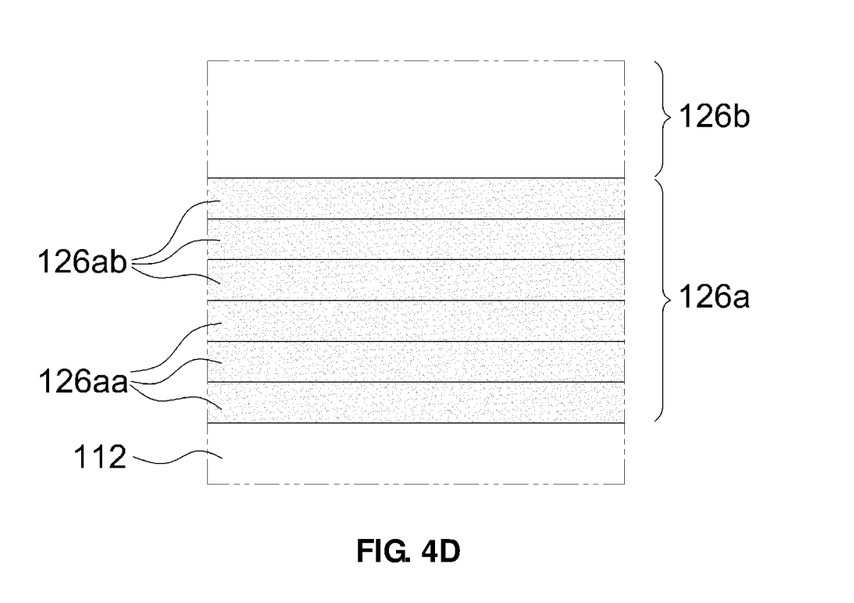
Figure 4E:
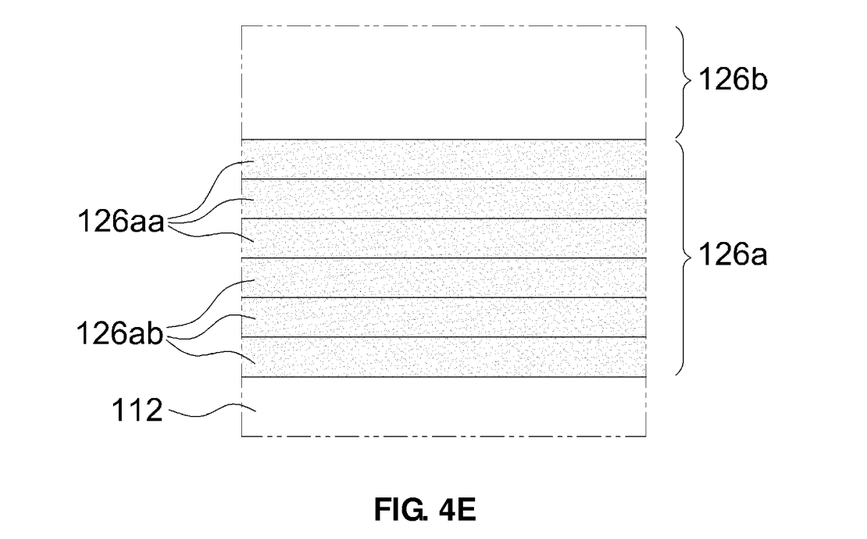

As illustrated in FIGS. 4D-4E, two or more low-angle inner helical layers of the plurality of low-angle inner helical layers of the low-angle inner helical layer portion 126a may be the high-strength low-angle inner helical layer 126aa having relatively greater stiffness and strength than the remaining low-angle inner helical layers. In other words, some of the plurality of low-angle inner helical layers of the low-angle inner helical layer portion 126a may be the high-strength low-angle inner helical layer 126aa. The remaining low-angle inner helical layers may be the low-strength low-angle inner helical layer 126ab.

Figure 4F:
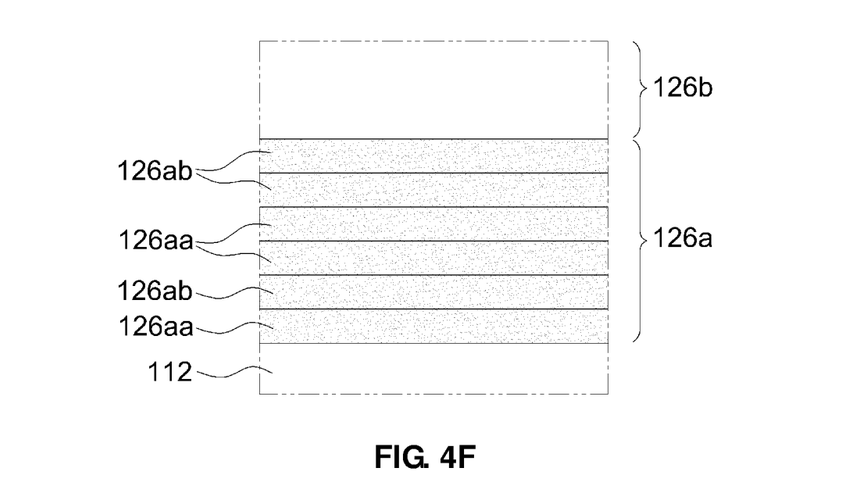
Figure 4G:
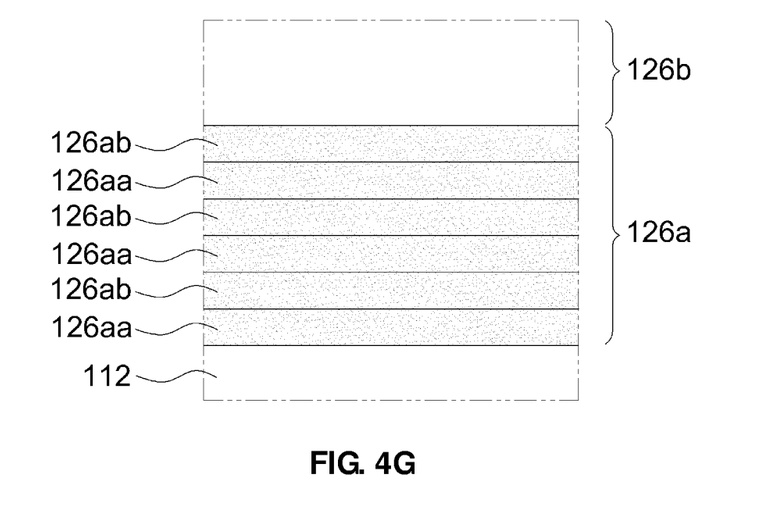

In other words, based on the thickness direction of the low-angle inner helical layer portion 126a, all of the high-strength low-angle inner helical layers 126aa may be disposed in the inner layer region of the low-angle inner helical layer portion 126a, and all of the low-strength low-angle inner helical layers 126ab may be disposed in the outer layer region of the low-angle inner helical layer portion 126a (FIG. 4D). Alternatively, based on the thickness direction of the low-angle inner helical layer portion 126a, the high-strength low-angle inner helical layers 126aa may be disposed in the outer layer region of the low-angle inner helical layer portion 126a. The low-strength low-angle inner helical layers 126ab may be disposed in the inner layer region of the low-angle inner helical layer portion 126a FIG. 4E In other words, the overall thickness of the high-strength low-angle inner helical layers 126aa may be equal to or different from the overall thickness of the low-strength low-angle inner helical layers 126ab. As illustrated in FIGS. 4F-4G, in the low-angle inner helical layer portion 126a, the plurality of high-strength low-angle inner helical layers 126aa and the plurality of low-strength low-angle inner helical layers 126ab may be disposed in a mixed manner without limiting the order of laminating the layers (e.g., the order of winding the fiber reinforced plastic). The high-strength low-angle inner helical layers 126aa and the low-strength low-angle inner helical layers 126ab may be disposed in a mixed manner in which the high-strength low-angle inner helical layers 126aa and the low-strength low-angle inner helical layers 126ab may be sequentially and alternately laminated on one another. In particular, the high-strength low-angle inner helical layer 126aa or the low-strength low-angle inner helical layer 126ab may be disposed as a lowest layer of the low-angle inner helical layer portion 126a.

Figure 4H:
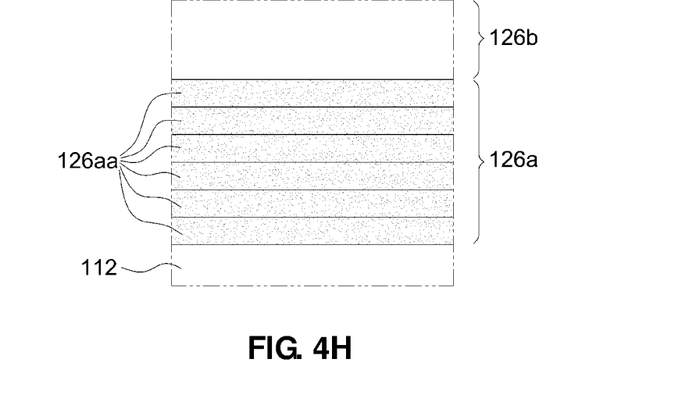

As illustrated in FIG. 4H, all of the plurality of low-angle inner helical layers that form the low-angle inner helical layer portion 126a may be the high-strength low-angle inner helical layer 126aa. Particularly, the low-angle inner helical layers (e.g., the high-strength low-angle inner helical layers and the low-strength low-angle inner helical layers) of the low-angle inner helical layer portion 126a may be formed by being laminated in a winding pattern in which the fiber reinforced plastic, wound around the outer surface of the liner layer 110 and may be wound at an acute angle within a predetermined range with respect to the direction L of the central axis of the high pressure tank 100. Specifically, the low-angle inner helical layers may be formed by being laminated in a low-angle helical pattern in which the fiber reinforced plastic is wound at an acute angle of about α to 44° with respect to the direction L of the central axis of the high pressure tank 100 FIG. 6C. When the low-angle inner helical layers are wound as described above a portion of the helical layers of the cylinder portion 122 may be simultaneously formed.

The low-angle inner helical layer portion 126a and the low-angle outer helical layer portion 126b may be formed using various fiber reinforced plastics (e.g., a composite material which uses carbon fiber as reinforcing fiber and a composite material which uses glass fiber as reinforcing fiber). Some low-angle inner helical layers of the low-angle inner helical layer portion 126a may be formed by using the fiber reinforced plastic having relatively greater strength and stiffness than fiber reinforced plastics of the other low-angle inner helical layers and the low-angle outer helical layers. Therefore, the usage amount of the fiber reinforced plastic and the thickness of the dome portion 124 may be reduced. Additionally, the weight and manufacturing costs of the high pressure tank may be reduced and the fuel weight efficiency may be improved due to the reduction in weight of the high pressure tank 100. The supply amount of fuel stored in high pressure tank 100 may be increased and may accordingly increase a distance which a vehicle may travel.

Since at least one low-angle inner helical layer of the plurality of low-angle inner helical layers that forms the low-angle inner helical layer portion 126a of the dome portion 124 may be the high-strength low-angle inner helical layer 126aa, the inner layer region (e.g., the low-angle inner helical layer portion) of the dome portion 124 may have a greater bursting strength and stiffness than the outer layer region (e.g., low-angle outer helical layer portion). In the dome portion 124, about 5% to 30% of the overall thickness of the low-angle inner helical layer portion 126a which is the inner layer and the low-angle outer helical layer portion 126b, which is the outer layer, may be formed as the low-angle inner helical layer portion 126a and about 70% to 95% of the overall thickness may be formed as the low-angle outer helical layer portion 126b.

When the thickness of the low-angle inner helical layer portion 126a is less than about 5% of the overall thickness of the dome portion 124, may be difficult to increase strength and stiffness of the dome portion 124 to a desired level. Additionally, when the thickness of the low-angle inner helical layer portion 126a is greater than about 30% of the overall thickness of the dome portion 124, the effect of reinforcing strength and stiffness of the dome portion 124 is not improved with respect to costs Typically, since the fiber reinforced plastic having greater strength and greater stiffness are expensive, it is necessary to increase strength and stiffness of the dome portion 124 while minimizing the usage amount of the fiber reinforced plastic having high strength.

In other words, may be possible to increase strength and stiffness of the dome portion 124 to a desired level even though the thickness of the low-angle inner helical layer portion 126a including the high-strength low-angle interior helical layer 126aa is greater than about 30% of the overall thickness of the dome portion 124. In other words, strength and stiffness of the dome portion 124 may be increased to a desired level even though the high-strength low-angle inner helical layer 126aa is disposed in a region that exceeds about 30% of the overall thickness of the dome portion 124. However, when the thickness of the low-angle inner helical layer portion 126a is greater than about 30% of the overall thickness of the dome portion 124, the effect of reinforcing the dome portion 124 may not be improved with respect to the usage amount of the fiber reinforced plastic and material costs.

Figure 5:
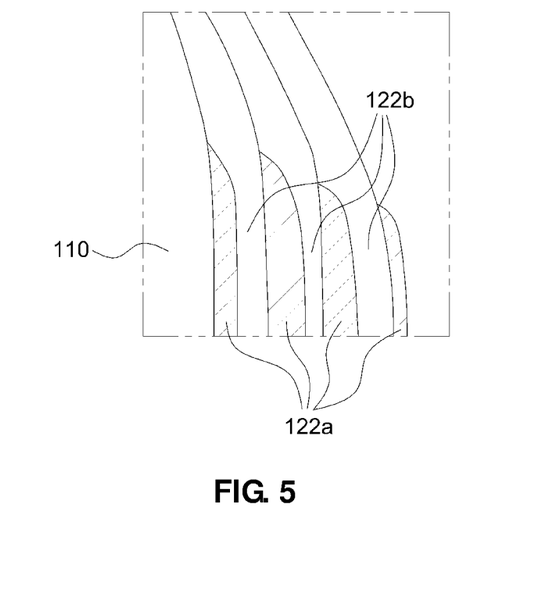
FIG. 5 is an exemplary enlarged view illustrating part C in FIG. 1 according to an exemplary embodiment of the present disclosure.

The thickness of the dome portion 124 may be structurally increased toward a portion closer to the metal boss 112, and as a result, the thickness of the low-angle interior helical layer portion 126a may also be increased. Further, as illustrated in FIG. 5, a transition portion 128, which is a section where the hoop layer 122a of the cylinder portion 122 terminates may be disposed between the dome portion 124 and the cylinder portion 122. The cylinder portion 122, which is the straight section of the support layer 120, and the dome portion 124, which is the curved section are connected to each other at the transition portion 128.

In order to monitor the effect of increasing bursting pressure (e.g., bursting strength) of the high pressure tank when strength and stiffness of the dome portion is reinforced in accordance with the present disclosure, a high pressure tank (Comparative Example 1) in which the dome portion of the support layer is manufactured by using a single fiber reinforced plastic and high pressure tanks (Examples 1 and 2) in which the dome portion of the support layer is manufactured using heterogeneous fiber reinforced plastics were prepared. Further, the bursting pressure of the high pressure tank according to Comparative Example 1 and bursting pressure of the high pressure tanks according to Examples 1 and 2 were measured. The measurement results are shown in the following Table 1.

In particular, the high pressure tanks according to Examples 1 and 2 and the high pressure tank according to Comparative Example 1 were manufactured under the same condition, except that the dome portion of the support layer of the high pressure tank according to Comparative Example 1 was formed using a low-strength fiber reinforced plastic having strength of 2,550 MPa and stiffness of 135 GPa. The dome portions of the support layers of the high pressure tanks according to Examples 1 and 2 were formed by mixing and using a high-strength fiber reinforced plastic having strength of 3,040 MPa and stiffness of 159 GPa and a low-strength fiber reinforced plastic having strength of 2,550 MPa and stiffness of 135 GPa.

However, the high pressure tank according to Example 1 was manufactured using the high-strength fiber reinforced plastic for a thickness region which corresponds to 5% of the overall thickness of the dome portion and is adjacent to the liner layer. The low-strength fiber reinforced plastic is used for the remaining thickness region which corresponds to 95% of the overall thickness of the dome portion, and the high pressure tank according to Example 2 was manufactured using the high-strength fiber reinforced plastic for the highest layer (e.g., outermost layer) in a thickness region which corresponds to 30% of the overall thickness of the dome portion and is adjacent to the liner layer. The low-strength fiber reinforced plastic is used for the remaining thickness region which corresponds to 70% of the overall thickness of the dome portion.

TABLE 1

|  | Bursting Pressure |
| --- | --- |
| Comparative Example 1 | 1.00 |
| Example 1 | 1.03 |
| Example 2 | 1.04 |

As shown in Table 1, the high pressure tanks according to Examples 1 and 2 have greater bursting pressure than the high pressure tank according to Comparative Example 1. Accordingly, when manufacturing a high pressure tank which has bursting pressure at the same level as that of Comparative Example 1, it is possible to reduce the usage amount of the fiber reinforced plastic, reduce a weight of the high pressure tank, and increase hydrogen weight efficiency in comparison with Comparative Example 1. The bursting pressure of Examples 1 and 2 are determined based on the value of Comparative Example 1.

Figure 7:
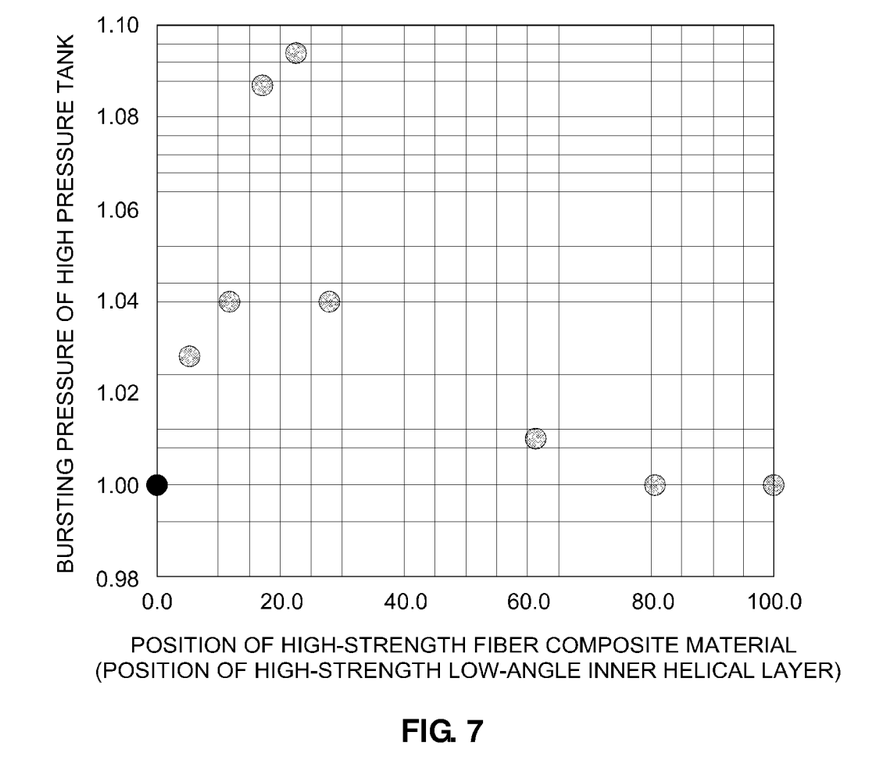
FIG. 7 is an exemplary graph illustrating bursting pressure of the high pressure tank with respect to positions of a high-strength low-angle inner helical layer formed by winding a high-strength fiber reinforced plastic in accordance with an exemplary embodiment of the present disclosure.
Figure 8:
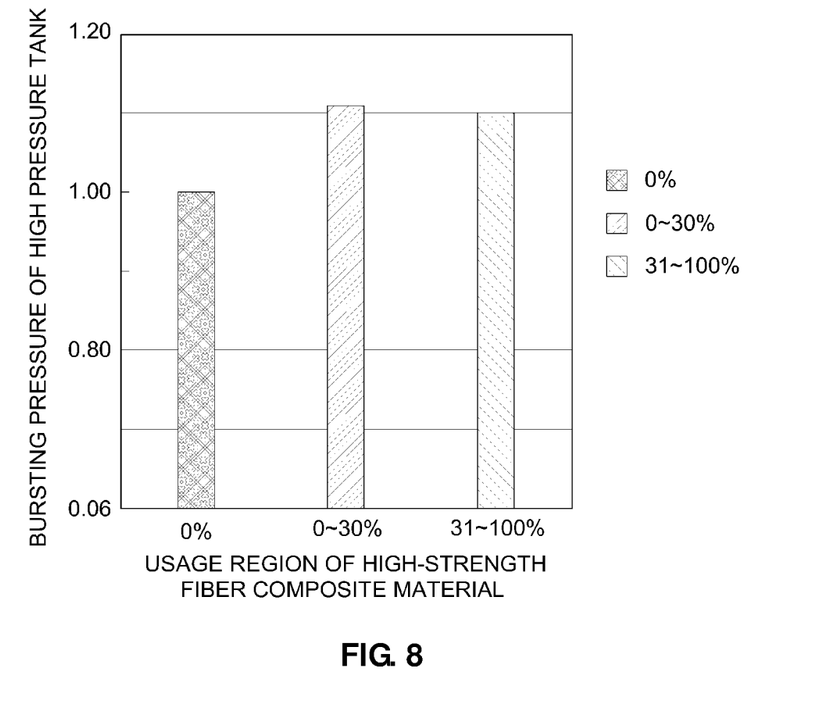
FIG. 8 is an exemplary graph illustrating bursting pressure of the high pressure tank with respect to usage regions of a thickness region of a dome portion, in which the high-strength low-angle inner helical layer is used, in accordance with an exemplary embodiment of the present disclosure.

Further, FIG. 7 illustrates bursting pressure of the high pressure tank with respect to positions of the high-strength low-angle inner helical layers formed by winding the high-strength fiber reinforced plastic. FIG. 8 illustrates bursting pressure of the high pressure tank with respect to usage regions of the thickness region of the dome portion, in which the high-strength low-angle inner helical layers are used. The respective bursting pressure values are determined based on bursting pressure values when high-strength fiber reinforced plastic is not used.

Referring to FIG. 7, the bursting pressure of the high pressure tank varies based on the position of the high-strength low-angle inner helical layer formed as a single layer by winding once the high-strength fiber reinforced plastic based on the thickness of the dome portion. In particular, the bursting pressure is increased when the high-strength low-angle inner helical layer is positioned as any one layer within a thickness region corresponding to about 5 to 30% of the thickness of the dome portion. The bursting pressure is significantly increased when the high-strength low-angle interior helical layer is positioned as any one layer within a thickness region corresponding to about 15 to 25% of the thickness of the dome portion.

Referring to FIG. 8, when the high-strength low-angle interior helical layer is formed by entirely winding the high-strength fiber reinforced plastic in a thickness region corresponding to about 0% to 30% of the thickness of the dome portion, the bursting pressure of the high pressure tank is increased in comparison with when no high-strength fiber reinforced plastic is used and when the high-strength fiber reinforced plastic is wound in another thickness region.

When the bursting pressure of the high pressure tank is about 1.00 when the dome portion is formed using the low-strength fiber reinforced plastic without using the high-strength fiber reinforced plastic, the bursting pressure of the high pressure tank when the high-strength fiber reinforced plastic was wound in a thickness region corresponding to about 0% to 30% of the thickness of the dome portion was 1.11. The bursting pressure of the high pressure tank when the high-strength fiber reinforced plastic was wound in a thickness region corresponding to about 31% to 100% of the thickness of the dome portion was 1.10.

When the high-strength fiber reinforced plastic was entirely used for the thickness region corresponding to about 0% to 30% of the thickness of the dome portion as described above, the bursting pressure of the high pressure tank was increased in comparison with the case in which the low-strength fiber reinforced plastic is used without using the high-strength fiber reinforced plastic. The higher bursting pressure of the high pressure tank may be obtained even though a minimal amount of the high-strength fiber reinforced plastic was used in comparison with the case in which the high-strength fiber reinforced plastic is entirely used for the thickness region corresponding to about 31 & to 100% of the thickness of the dome portion.

Therefore, it can be seen that the effect of increasing bursting pressure of the high pressure tank may be obtained using the high-strength fiber reinforced plastic in a predetermined region of the dome portion based on the thickness of the dome portion in accordance with the present disclosure. The disclosure has been described in detail with reference to exemplary embodiments thereof. However, it will be appreciated by those skilled in the art that changes may be made in these exemplary embodiments without departing from the principles and spirit of the disclosure, the scope of which is defined in the appended claims and their equivalents.

What is claimed is:

1. A high pressure tank, comprising:
   a support layer, which defines an outer layer of the high pressure tank and includes a cylinder portion at a center thereof, wherein the cylinder portion is formed to have a structure in which hoop layers and helical layers, which are laminated on an outer surface of a liner layer, are alternately laminated, and wherein one of the hoop layers is laminated first to position an exterior surface of the liner layer in direct contact with the one hoop layer; and
   dome portions formed at both sides of the cylinder portion, wherein each of the dome portions includes a low-angle inner helical layer portion, which is an inner layer, and a low-angle outer helical layer portion, which is an outer layer,
   wherein the dome portions include only the low-angle inner helical layer portion without having any of the hoop layers, and the low-angle inner helical layer portion includes a plurality of low-angle inner helical layers,
   wherein at least one low-angle inner helical layer of the plurality of low-angle inner helical layers has greater stiffness and strength than any other of the plurality of low-angle inner helical layers of the low-angle inner helical layer portion, and also has greater stiffness and strength than any layer of the low-angle outer helical layer portion,
   wherein the at least one low-angle inner helical layer is formed of a fiber reinforced plastic having relatively greater strength and stiffness than fiber reinforced plastics of any other of the plurality of low-angle inner helical layers of the low-angle inner helical layer portion or any layer of the low-angle outer helical layer portion, and
   wherein the at least one low-angle inner helical layer is positioned in a thickness region corresponding to about 15% to 25% of a thickness of the dome portions such that the at least one low-angle inner helical layer is entirely wound around the dome portions in the thickness region.

2. The high pressure tank of claim 1, wherein the low-angle inner helical layer portion is formed in a thickness region corresponding to about 5% to 30% of an overall thickness of each dome portion.

3. The high pressure tank of claim 1, wherein the low-angle outer helical layer portion is formed in a thickness region corresponding to about 70% to 95% of an overall thickness of the dome portions.

4. The high pressure tank of claim 1, wherein a portion of the plurality of low-angle inner helical layers of the low-angle inner helical layer portion are high-strength low-angle inner helical layers having relatively high stiffness, and the remaining low-angle inner helical layers are low-strength low-angle inner helical layers having relatively low stiffness.

5. The high pressure tank of claim 4, wherein the high-strength low-angle inner helical layers are disposed as inner layers of the low-angle inner helical layer portion, and wherein all of the low-strength low-angle inner helical layers are disposed as outer layers of the low-angle inner helical layer portion.

6. The high pressure tank of claim 4, wherein the high-strength low-angle inner helical layers are disposed as outer layers of the low-angle inner helical layer portion, and wherein all of the low-strength low-angle inner helical layers are disposed as inner layers of the low-angle inner helical layer portion.

7. The high pressure tank of claim 4, wherein the high-strength low-angle inner helical layer and the low-strength low-angle inner helical layer are disposed in a mixed pattern without limiting the order of laminating the layers.

8. The high pressure tank of claim 4, wherein the high-strength low-angle inner helical layer and the low-strength low-angle inner helical layer are disposed in a mixed pattern in which the layers are alternately laminated on one another.

9. The high pressure tank of claim 1, wherein the low-angle inner helical layer portion is configured by the high-strength low-angle inner helical layer.

10. The high pressure tank of claim 1, wherein the high-strength low-angle inner helical layer is disposed as a bottom layer of the low-angle inner helical layer portion.

11. The high pressure tank of claim 1, wherein the dome portions are formed by winding a fiber reinforced plastic around outer surfaces of a liner layer, and wherein a metal boss is disposed at an acute angle within a predetermined range with reference to a direction of a central axis of the high pressure tank.

12. A high pressure tank, comprising:
- a support layer, which defines an outer layer of the high pressure tank and includes a cylinder portion at a center thereof; and
- dome portions formed at both sides of the cylinder portion, wherein each of the dome portions includes a low-angle inner helical layer portion, which is an inner layer, and a low-angle outer helical layer portion, which is an outer layer,
- wherein the dome portions include only the low-angle inner helical layer portion without having any of the hoop layers, and the low-angle inner helical layer portion includes a plurality of low-angle inner helical layers,
- wherein at least one low-angle inner helical layer of the plurality of low-angle inner helical layers has greater stiffness and strength than any other of the plurality of low-angle inner helical layers of the low-angle inner helical layer portion, and also has greater stiffness and strength than any layer of the low-angle outer helical layer portion,
- wherein the high-strength low-angle inner helical layer is disposed as an inner layer of the low-angle inner helical layer portion, and low-strength low-angle inner helical layers are disposed as outer layers of the low-angle inner helical layer portion,
- wherein the low-angle inner helical layer portion and the low-angle outer helical layer portion are formed of various fiber reinforced plastics including a composite material that uses carbon fiber as reinforcing fiber and a composite material that uses glass fiber as reinforcing fiber,
- wherein the at least one low-angle inner helical layer is formed of a fiber reinforced plastic having relatively greater strength and stiffness than the fiber reinforced plastics of any other of the plurality of low-angle inner helical layers of the low-angle inner helical layer portion or any layer of the low-angle outer helical layer portion, and
- wherein the at least one low-angle inner helical layer is positioned in a thickness region corresponding to about 15% to 25% of a thickness of the dome portions such that the at least one low-angle inner helical layer is entirely wound around the dome portions in the thickness region.

* * * * *